Feb. 7, 1939.  W. E. REED  2,146,652
METHOD OF AND APPARATUS FOR CONTROLLING ELECTRICAL CIRCUITS
Filed Oct. 21, 1933

INVENTOR
William Edgar Reed,
By Archworth Martin,
Attorney.

Patented Feb. 7, 1939

2,146,652

UNITED STATES PATENT OFFICE 2,146,652

METHOD OF AND APPARATUS FOR CONTROLLING ELECTRICAL CIRCUITS

William Edgar Reed, Pittsburgh, Pa.

Application October 21, 1933, Serial No. 694,578

7 Claims. (Cl. 250—27)

The invention relates primarily to the control of electrical circuits wherein it is desired that the application of current be of extremely short duration, and whereby such applications of current may be repeated at definite or periodic times, as may be desired.

While the invention is hereinafter described more in detail as applied to the electrical welding of material in those cases where the material is of small cross section such as wires of the smaller gages, it may be employed also in the producing of various other electrical effects such as flash signalling, power flashes, vibrations, and other electrically-produced impulses of short duration.

My invention has for its object the provision of a method for effecting impulses or forces of extremely short duration through the setting up of two forces, which produce opposite results, in such manner that the application of the desired working force is of shorter duration than is possible in those cases where a circuit-making and circuit-breaking forces are established in sequence.

In many cases the duration of current flow desired is less than the time required to initiate separate forces in sequence and they must therefore be initiated simultaneously and be of such a character that they cause a current flow followed by the interruption thereof after an extremely short duration of current flow. Such forces may have different characteristics, and they may be constant or varying forces, and one may vary in increasing strength, while the other is varying in decreasing strength, and vice versa, and they may vary periodically so that first one force prevails and then the other, to produce a flow and then an interruption, or be performed repeatedly over a desired period of time. Such forces may be mechanical, electrical, or magnetic, or a combination of such forces. The simultaneously-initiated forces may also first make current flow and instantaneously develop conditions which will prevent the continuation of this flow.

Figure 1:
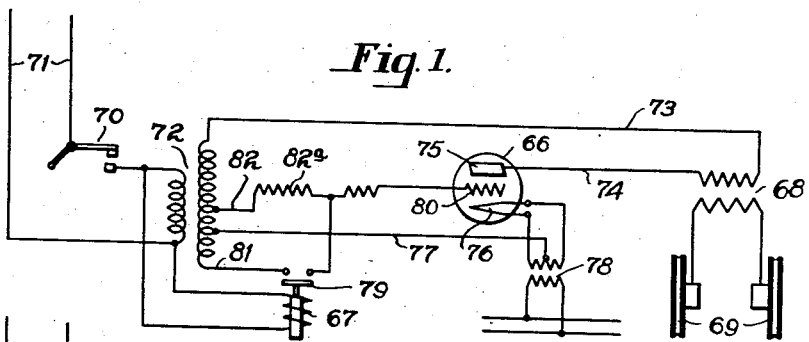
Figure 2:
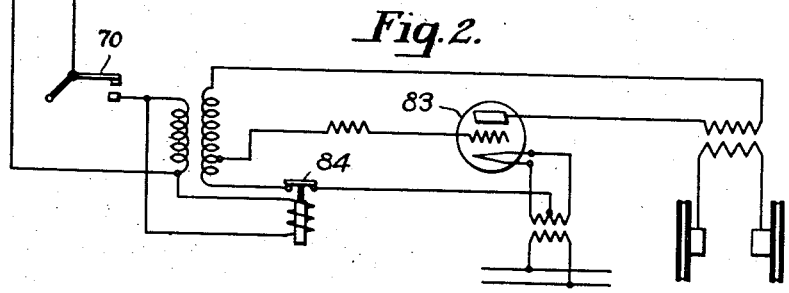

Some of the ways by which the invention may be practised are shown in the accompanying drawing, wherein Figure 1 is a partially diagrammatic view showing one manner in which the flow of welding current may be controlled, and Fig. 2 shows a modification of the structure of Fig. 1.

As one specific example of the manner in which the invention may be practised, the accompanying drawing illustrates a portion of a machine for supplying current to welding electrodes, in the making of wire mesh, and only so much of the welding machine is shown as is required to an understanding of the invention, the complete machine being disclosed in my Patent No. 1,694,081.

Referring now to Fig. 1, I show a structure wherein a circuit is established through a gas-filled electronic tube 66, with an electromagnet 67, for effecting de-energization of the circuit, to thereby control the duration of current flow at the transformer 68, and consequently to welding electrodes 69, it being understood, of course, that the electrical impulses in the tube circuit may be employed for other purposes than welding, as heretofore explained.

Upon closing of the switch 70 of AC line 71, by movement of the conveyor as shown in my said patent or otherwise, a transformer 72 will be energized to establish flow of current through conductor 73—74, electrodes 75 and 76 of tube 66, and conductor 77, thereby effecting energization of the load or transformer 68. The filament 76 is permanently heated from a suitable source of current through a transformer 78, so that the circuit will be instantly energized upon closing of the switch 70.

Closing of the switch 70 energizes the electromagnet 67, which effects closing of a switch 79. The speed of operation of the magnet is such that current will flow through the transformers for an appreciable period of time before the switch 79 is closed. This "lag" in operation can be varied by controlling the speed of operation of the electromagnet in any of well-known ways, for example, as stated in my Patent 1,932,119.

Upon excitation of the transformer 72, the grid 80 of the tube is given a positive potential relative to the cathode. Upon closing of the switch 79, the grid is rendered negative thereto, and current flow through the tube is interrupted.

The negative potential on the grid 80 is effected because the conductor 81 of the switch is connected to the secondary transformer winding at a point farther from the middle and is more negative than is the filament conductor 77, while conductor 82 to which the grid 80 is initially connected is given positive potential relative to the potential on line 77. Resistance coil 82a is for the purpose of preventing short-circuiting of part of the transformer through switch 79. The duration of current flow to the welding electrodes is therefore definitely limited, even though the switch 70 may be held closed, and each closing movement of the switch will result in an electrical impulse of limited duration to the load.

Referring now to Fig. 2, I show an arrangement somewhat similar to that above, in that the flow of current is set up through a gaseous electronic tube 83, but instead of changing the grid from the positive to negative potential, I interrupt the tube circuit by a switch 84 which is operated in the same manner as the switch 79. Thus when the line switch 70 is closed, current will immediately flow through the electronic tube and the switch magnet be simultaneously energized. When the switch magnet becomes fully effective, it will physically break the tube circuit.

There are various other ways that electronic tubes may be used in the practising of this invention. Tubes acting as time delay relays may be used for one or both of the electro-responsive devices described. There are also several ways of producing ionization and deionization of a tube and limiting the duration of current flow to the load. This duration may be measured in cycles or in fractions of one cycle.

In welding fabric current application may be controlled for a single weld or may be periodically applied for a fixed speed of movement of the work—or it may be applied at a frequency proportional to and in synchronism with the speed of movement of the work.

Although I have shown specific applications, there are various other ways the method may be practised and applied—where single tubes act as rectifiers, double rectification may be used by employing two tubes.

I claim as my invention:—

1. The method of controlling duration of current flow in the load or output circuit of a gas filled power tube, which comprises simultaneously setting up or initiating two tube-controlling electro-motive forces, applying one E. M. F. to produce ionization and current flow through the tube, applying the other E. M. F. to produce de-ionization and cessation of current flow through the tube, and causing a time delay in the application of said other E. M. F. relative to the application of said first E. M. F. independently of the current flow in the load circuit.

2. The method of controlling duration of current flow in the load or output circuit of a gas filled power tube, which comprises simultaneously setting up or initiating an electric potential that produces ionization and current flow in the tube and another electric potential that destroys said ionization and current flow independently of the current flow in the load circuit, and applying said potentials in time-spaced relation.

3. The method of controlling duration of current flow in the load or output circuit of a gas filled power tube, which comprises simultaneously setting up or initiating an electric potential that produces ionization and current flow in the tube and another electric potential that destroys said ionization and current flow, applying said potentials in time-spaced relation, and controlling the timing period between the application of said forces, independently of the current flow in the load circuit.

4. The method of controlling current flow in the load circuit of a gas filled power tube which comprises applying an electric potential that produces ionization and current flow through the tube, initiating simultaneously with the said potential a second electric potential to destroy said ionization, and causing the second potential to be concurrently but more slowly operative than the first-named potential, independently of the current flow in the load circuit.

5. The method of controlling current flow in the output circuit of a gas filled power tube which comprises simultaneously initiating a positive grid bias potential that produces ionization and a current flow through the tube and a second electrical potential to destroy the said ionization, applying said potentials, but causing said second potential to be applied subsequent to the application of said first potential, independently of the current flow in the output circuit.

6. In an electrical timing system, the combination with a load circuit and an electronic tube, for controlling current flow thereto, of circuit means for connecting said tube and load circuit to a source of electric energy, control means responsive to application of electric potential to said circuit means for setting up current flow in said tube and said load circuit, electro-responsive means in said circuit means for controlling current flow therein, and means for simultaneously applying operating electrical energy to said circuit means and said electro-responsive means, said electro-responsive means being more slowly responsive to energization than the said control means.

7. In an electrical timing system, the combination with a load circuit and an electronic tube, for controlling current flow thereto, of circuit means for connecting said tube and load circuit to a source of electric energy, a control electrode for said tube, means for applying positive biasing potential to said electrode to cause current flow in the tube, electro-responsive means in said circuit means, for acting upon said biasing means to discontinue said flow, and means for simultaneously applying operating electrical energy to said circuit means and said electro-responsive means, said electro-responsive means being more slowly responsive to energization than the said control means.

WILLIAM EDGAR REED.